United States Patent [19]

Brouwer et al.

[11] Patent Number: 4,890,801

[45] Date of Patent: Jan. 2, 1990

[54] CUTOFF MECHANISM FOR A SOD LAYING MACHINE

[75] Inventors: Gerardus J. Brouwer, Keswick; Henry Zwambag, Sutton, both of Canada

[73] Assignee: Brouwer Turf Equipment Limited, Keswick, Canada

[21] Appl. No.: 177,759

[22] Filed: Apr. 5, 1988

Related U.S. Application Data

[62] Division of Ser. No. 776,242, Sep. 26, 1995, Pat. No. 4,754,815.

[30] Foreign Application Priority Data

Sep. 17, 1984 [CA] Canada .................................. 463424

[51] Int. Cl.4 ............................................. A01B 45/00
[52] U.S. Cl. .................................... 242/56 B; 172/20; 172/15; 414/24.6; 414/911; 242/86.52
[58] Field of Search .............................. 172/15, 19, 20; 242/86.5 R, 86.52, 54 R, 65, 55.1, 56 B, 56 R; 414/24.5, 24.6, 501, 529, 911; 30/379.5

[56] References Cited

U.S. PATENT DOCUMENTS

| | | | |
|---|---|---|---|
| 1,687,928 | 10/1928 | Castricum et al. | 242/56 R |
| 2,427,611 | 9/1947 | Lane | 242/56 R |
| 3,931,940 | 1/1976 | Raighn et al. | 242/56 R |
| 4,063,385 | 12/1977 | Friedberg | 47/56 X |
| 4,354,556 | 10/1982 | Evans | 242/86.52 X |
| 4,572,451 | 2/1986 | Ikeda et al. | 242/56 R |

FOREIGN PATENT DOCUMENTS

| | | | |
|---|---|---|---|
| 3125553 | 1/1983 | Fed. Rep. of Germany | 242/56 B |
| 649568 | 2/1979 | U.S.S.R. | 252/56 B |

*Primary Examiner*—Richard J. Johnson
*Assistant Examiner*—Jeffrey L. Thompson
*Attorney, Agent, or Firm*—Rogers, Bereskin & Parr

[57] ABSTRACT

A sod laying machine having front and rear sections articulated together. A boom on the front section has arms extending forwardly, with gripper arms extending downwardly from the boom to grip a roll of sod. A control roller connected to the boom arms drives the sod roll to control its speed of unwinding. The sod roll has its grass side facing outwardly and its top unwinds rearwardly so an operator in a seat at the front of the machine, between the boom arms, has an unobstructed view of the critical area of sod extending in the air from the roll to the ground, to reduce the likelihood of buckles and tears therein. The machine passes over the sod after it is laid, to roll the sod.

4 Claims, 8 Drawing Sheets

CUTOFF MECHANISM FOR A SOD LAYING MACHINE

This is a division of Ser. No. 776,242, field 9/26/85, now U.S. Pat. No. 4,754,815.

FIELD OF THE INVENTION

This invention relates to a machine for laying cut sod from a roll of sod, to produce a lawn, and to a method of laying sod.

BACKGROUND OF THE INVENTION

Sod harvesting machines have long existed for harvesting sod and forming it into rolls, slabs or the like so that such cut sod may be laid in an appropriate location to produce a lawn. However no commercially successful machines have ever been available to lay the cut sod. Instead the laying operation has always been labour intensive and back breaking. The heavy rolls or slabs of sod are lifted, commonly by hand, to the desired location and are then unrolled and laid as closely as possible against the edge of the previously laid sod. Frequently the sod after being laid must be pushed sideways over the ground to fit tightly against the edge of the adjoining sod. The operation is time consuming and arduous.

There are numerous difficulties involved in laying sod by machine. Sod is an extremely difficult material with which to work, because it is heavy (due to the layer of earth attached to the roots of the grass) and yet it has very little tensile strength. The tensile strength of the sod can also vary greatly from one sample to another depending on the condition of the sod, such as its thickness, its age, the type of soil, whether it is wet or dry, and even depending on the variety of grass. In addition the characteristics of the sod can vary greatly from one point in a roll of sod to another, e.g. if the roll has been left sitting in which case the top of the roll tends to dry out and the bottom of the roll tends to become more moist. The sod also tends to stretch unevenly when it is being laid, forming unsightly buckles which must be removed, and it may frequently break, interrupting the sod laying operation.

In addition the locations in which sod must be laid are frequently restricted as to access and limited in space. Further, the sod must commonly be laid up against walls and fences. Therefore a successful sod laying machine should be relatively small and maneuverable and able to lay the fragile sod accurately while reducing the likelihood of breaks and buckles in the sod.

BRIEF SUMMARY OF INVENTION

Accordingly it is an object of the invention to provide a sod laying machine which can lay cut sod from a roll in a controlled manner. In one of its aspects the invention provides a sod laying machine comprising:
(a) a frame,
(b) means mounted on said frame for driving said machine along a path of travel,
(c) means for steering said machine,
(d) support means mounted on said frame for supporting a roll of sod above the ground,
(e) and control means for engaging said roll of sod to control the speed at which said roll unwinds during travel of said machine.

In another aspect the invention provides a sod laying machine comprising:
(a) a frame,
(b) means mounted on said frame for driving said machine in a selected direction along a path of travel,
(c) means for steering said machine,
(d) support means mounted on said frame for supporting a roll of sod above the ground,
(e) a roll of sod engaged in said support means, the sod in said roll having its grass side facing outwardly and said sod being wound in a direction such that the upper surface of said roll must rotate in a direction opposite to said selected direction as said roll is being unwound with said machine travelling in said selected direction,
(f) and control means for engaging said roll of sod to control the speed at which said roll unwinds during travel of said machine.

In a further aspect the invention provides a method of laying sod comprising:
(a) employing a roll of sod having the grass side of said sod facing outwardly,
(b) suspending said roll of sod above the ground,
(c) supporting said roll of sod forwardly, and
(d) unwinding said roll of sod with the top of said roll unwinding in a rearward direction so that an operator located immediately behind said roll of sod may have an unobstructed view of the portion of the unwinding sod extending from said roll to said ground.

BRIEF DESCRIPTION OF THE DRAWINGS

Further objects and advantages of the invention will appear from the following description of a preferred embodiment of the invention, taken together with the accompanying drawings in which.

DETAILED DESCRIPTION OF PREFERRED EMBODIMENTS

Figure 1:
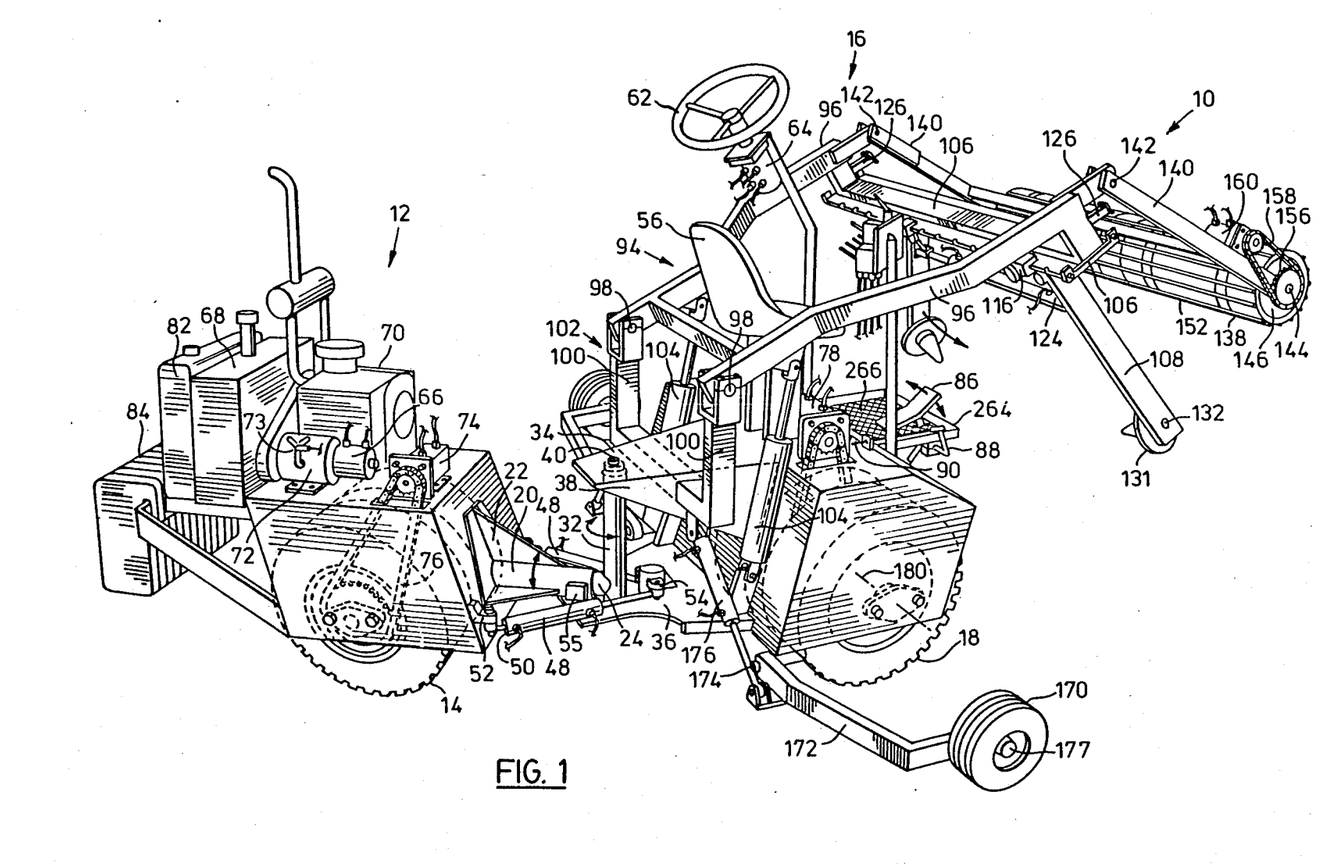
FIG. 1 is a perspective view of a sod laying machine according to the invention.
Figure 2:
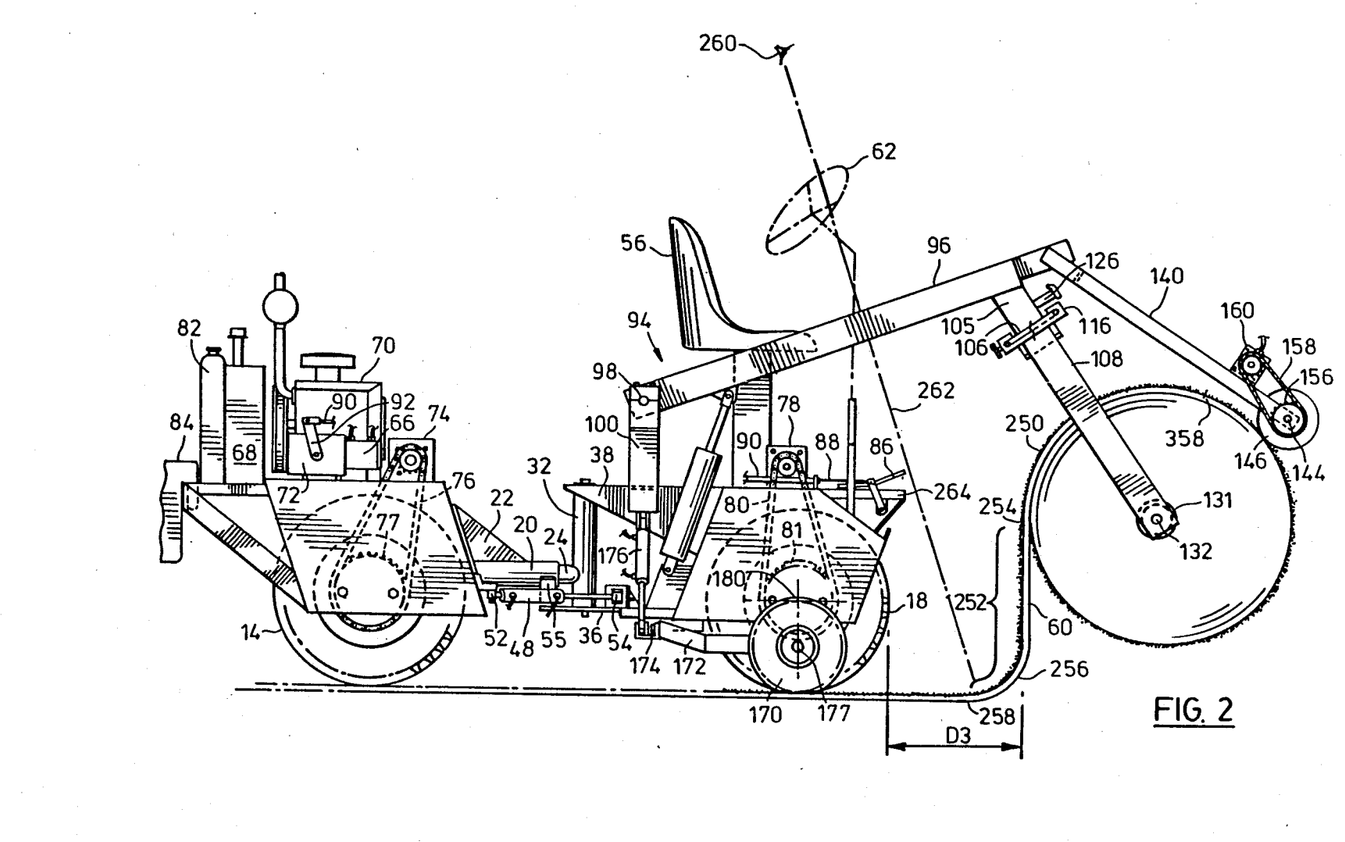
FIG. 2 is a side view of the sod laying machine of FIG. 1 showing the machine laying sod.

Reference is first made to FIGS. 1 and 2, which show a sod laying machine generally indicated at 10. The machine 10 includes a rear section 12 supported by rear drive wheels 14, and a front section 16 supported by front drive wheels 18.

Figure 3:
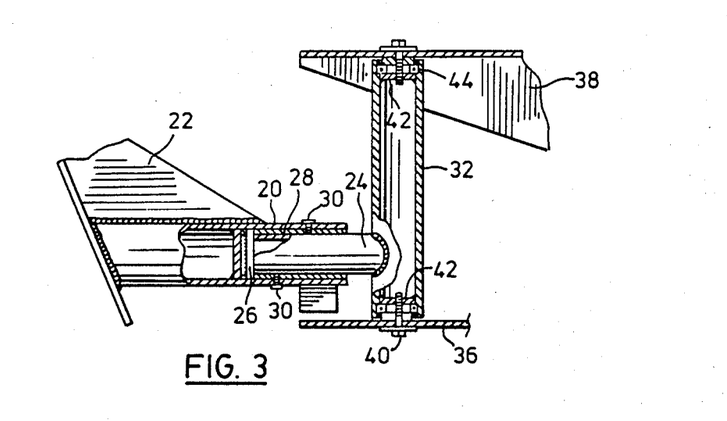
FIG. 3 is a sectional view showing the connection between two portions of the machine of FIGS. 1 and 2.

The front and rear sections 16, 12 are connected together by an articulated arrangement shown in FIGS. 1, 2 and 3. In this arrangement the rear section 12 includes a forwardly projecting hollow tube 20 fixed to and forming part of the frame 22 of the rear section. The tube 20 receives a front horizontally extending tube 24 having a retainer plate 26 fixed to its end. The front tube 24 is rotatably journaled within a sleeve 28 which is retained in the rear tube by bolts 30, so that the front tube 24 can rotate within the sleeve 28 about the longitudinal axis of the sleeve.

The first tube 24 is welded to a vertically extending tube 32 which is mounted between top and bottom plates 34, 36 which form part of the frame 38 of the front section 16. The vertical tube 32 is retained in position by bolts 40 which extend into cross plates 42 welded into the tube 32. Bearings 44 and bearing retaining washers are provided to enable free rotation of the tube 32.

Steering of the machine 10 is accomplished by two steering cylinders 48 having their butt ends 50 pivotally connected at 52 to the rear section 12 and having their piston rods pivotally connected at 54 to the front section 16. Thus when the piston of one steering cylinder 48 is extended and the piston of the other cylinder is retracted, the front section will be steered relative to the rear section.

The front tube 24 in the sleeve 28 permits the front and rear sections to pivot about a horizontal axis with respect to each other to allow for ground unevenness. However the extent of the pivoting is limited by stops 55 on the rear tube 20 which contact the lower plate 36 on the front section 16. This prevents undue pivoting, to avoid damage to the steering cylinders 48. The pivotal connections 52, 54 of the steering cylinders and their piston rods to the front and rear sections have ball joints to allow the limited pivoting permitted by the stops 55.

The operator of the machine sits in a seat 56 at the front of the machine, so that he can clearly view the roll of sod 58 (FIG. 2) which the machine is handling and can view the strip of sod 60 as it leaves the roll 58. A steering wheel 62 is mounted in front of the seat 56, having a steering valve 64 which is connected by a conventional hydraulic circuit (not shown) to an auxiliary hydraulic pump 66 and hydraulic reservoir 68. The pump 66 also powers the other cylinders in the machine, to be described.

The machine 10 is driven along the ground by a gasoline or diesel engine 70 which drives a variable displacement hydraulic pump 72 as well as the auxiliary pump 66. The pump 72 has forward, neutral and reverse built in and operated by a single lever 73. The pump 72 operates a rear wheel hydraulic drive motor 74 which is connected by a chain 76 and sprocket 77 to the rear wheels 14. The pump 72 also operates a front hydraulic drive motor 78 which is connected by a chain 80 and sprocket 81 to the front drive wheels 18. The details of the front and rear wheel drives will be described presently. The engine 70, hydraulic pumps 66, 72, hydraulic reservoir 68, together with a fuel tank 82 and balance weights 84, are all mounted over and to the rear of the rear section 12 to counterbalance the weight of the heavy sod roll 58.

The operator controls the variable displacement pump 72 by a foot pedal 86. The foot pedal 86 is connected by a rod 88 and cable 90 to the lever 73, to pump fluid at a varying rate depending on the extent to which the foot pedal 86 is depressed.

The sod handling portion of the machine 10 will next be described. As shown, a boom 94 is provided to lift the sod roll 58. The boom 94 includes a pair of forwardly extending boom arms 96, one on each side of the seat 56. Each arm is pivoted at 98 to an upright leg 100 of a U-shaped frame member 102 of the front section 16. The boom arms 96 are raised and lowered by a pair of conventional boom lift cylinders 104, one connected between each arm 96 and the plate 36 of the front section 16. The operator seat 56 is located between the boom arms 96 and forwardly of upright legs 100, for better viewing of the sod as it unrolls.

Figure 8:
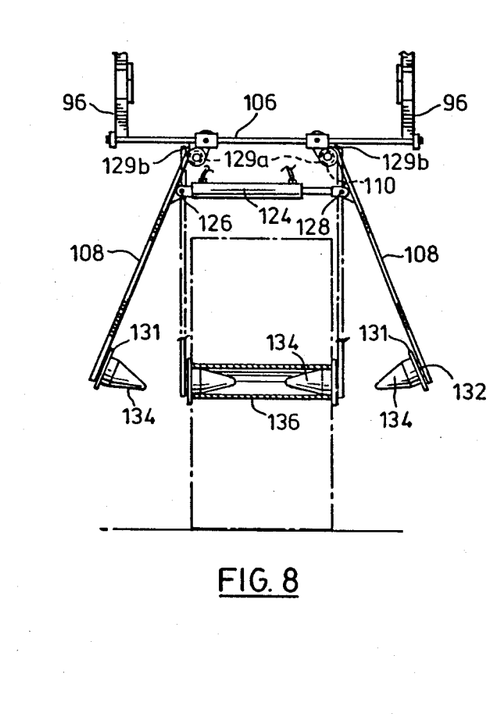
FIG. 8 is a front sectional view of the gripper arms and sod roll of FIG. 7, taken along lines 8—8 of FIG. 8.
Figure 9:
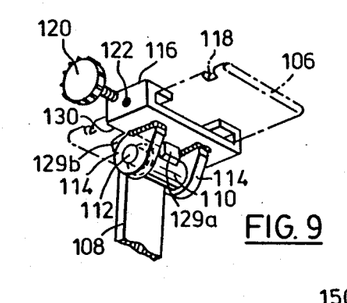
FIG. 9 is a perspective view of certain portions from FIG. 8.

At their forward ends the boom arms 96 have short downward extensions 105 which are connected together by a fixed cross member 106. Two gripper arms 108 (for gripping the sod roll 58) are slideably mounted on the cross member 106, as best shown in FIGS. 1, 8 and 9. As shown in FIGS. 8 and 9, each gripper arm 108 has a bushing 110 welded to its inner side surface near the top thereof. The bushing 110 is connected by a pivot shaft 112 to a pair of spaced plates 114 extending downwardly from the lower surface of a C-shaped bracket 116. The bracket 116 can slide laterally back and forth across the cross member 106. The cross member 106 includes notches 118 in its rear edge, and the bracket 116 may be secured over any desired notch 118 by screwing a hand wheel screw 120 through a hole 122 in the bracket 116 into one of the notches 118. As will be described, this arrangement allows the side to side position of the gripper arms 108 to be adjusted, which can be helpful when laying sod in restricted areas, and also permits the lateral spacing between the gripper arms 108 to be adjusted depending on the width of the sod being laid.

The gripper arms 108 are connected together by a gripper cylinder 124. Cylinder 124 has its butt end pivotally secured at 126 to one arm 108 and has its rod end pivotally secured at 128 to the other arm 108. The cylinder 124 serves to spread gripper arms 108 apart to receive a sod roll, as shown in full lines in FIG. 8, or to close them to vertically extending positions as shown in dotted lines in FIG. 8, to grip a sod roll.

The extent to which the gripper arms 108 may close is limited by a stop 129a which is welded to each end bushing 110. When one of the arms 108 closes or swings to a vertical position, the upper end of its stop 129a contacts the lower surface of the bracket 116, preventing further movement and allowing the cylinder 124 then to close the other arm 108. Similarly, the gripper arms 108 are prevented from opening too far (e.g. beyond about 20 degrees beyond a vertical position) by engagement of a stop 129b at the upper outer end of each arm 108 against the lower surface of the cross member 106.

At the end of each gripper arm 108 there is an inwardly facing disk 131 pivotally mounted by a pivot 132. Protruding inwardly from the disk 131 is a generally cone-shaped support 134. The cone-shaped supports 134 are adapted to protrude into a cardboard tube 136 about which the sod roll 58 has been rolled, in order to grip and lift the roll of sod. The supports 134 and disks 131 rotate with the sod roll.

When the sod roll 58 is lifted by the gripper arms 108 and is being unrolled, its rate of rotation is controlled by a control roller 138. The control roller 138 extends laterally across the front of the machine 10, is of about the same width as the cross member 106 (so that it will press against the roll of sod no matter where the roll is located laterally) and is held in position by a pair of support arms 140. Each support arm 140 is pivotally connected at 142 to the end of its associated boom arm 96.

Figure 10:
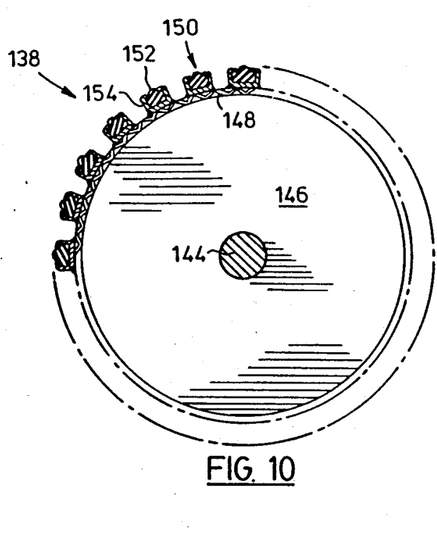
FIG. 10 is a side sectional view of a control roller.

As best shown in FIGS. 1 and 10, the control roller 138 includes a cross shaft 144 pivotally mounted in support arms 140, end disks 146 fixed to the cross shaft 144, and a metal cylinder 148 fixed to the end disks 146. The exterior of the control roller 138 has a roughened surface, typically constituted by rubber snowmobile track 150 having rubber ribs 152. Metal cleats 154 are welded to the cylinder 148 and secure the rubber ribs 152 to the control roller 138.

The control roller 138 includes a sprocket 156 fixed to the cross shaft 144 at one end thereof. The sprocket 156 is connected by chain 158 to a drive motor 160 which controls the rotational speed of the control roller 138. The hydraulic circuits of the control roller motor 160 and of the wheel drive motors 74, 78 are inter-connected as will be explained presently, to improve the operator's control over the sod roll 58 as it is laid.

The control roller 138 normally is biased against the sod roll 58 by gravity, as shown in FIG. 2. When there is no sod roll in place, the control roller 138 is held clear of the cross member 106, brackets 116 and gripper arms 108 by stops 126. The stops 126 project forwardly from and are welded to the downward extensions 105 at the ends of the boom.

To stabilize the machine during sod laying, outrigger wheels 170 are provided, mounted on arms 172 pivotally connected at 174 to the front section frame 38. Outrigger cylinders 176 are provided to raise and lower the outrigger wheels 170. The axis 177 of the outrigger wheels 170 is aligned with the axis 180 of the front wheels 18 in a front to rear direction (as best shown in FIG. 2) so that the outrigger wheels will not scuff newly laid sod when the machine 10 turns a corner.

Figure 11:
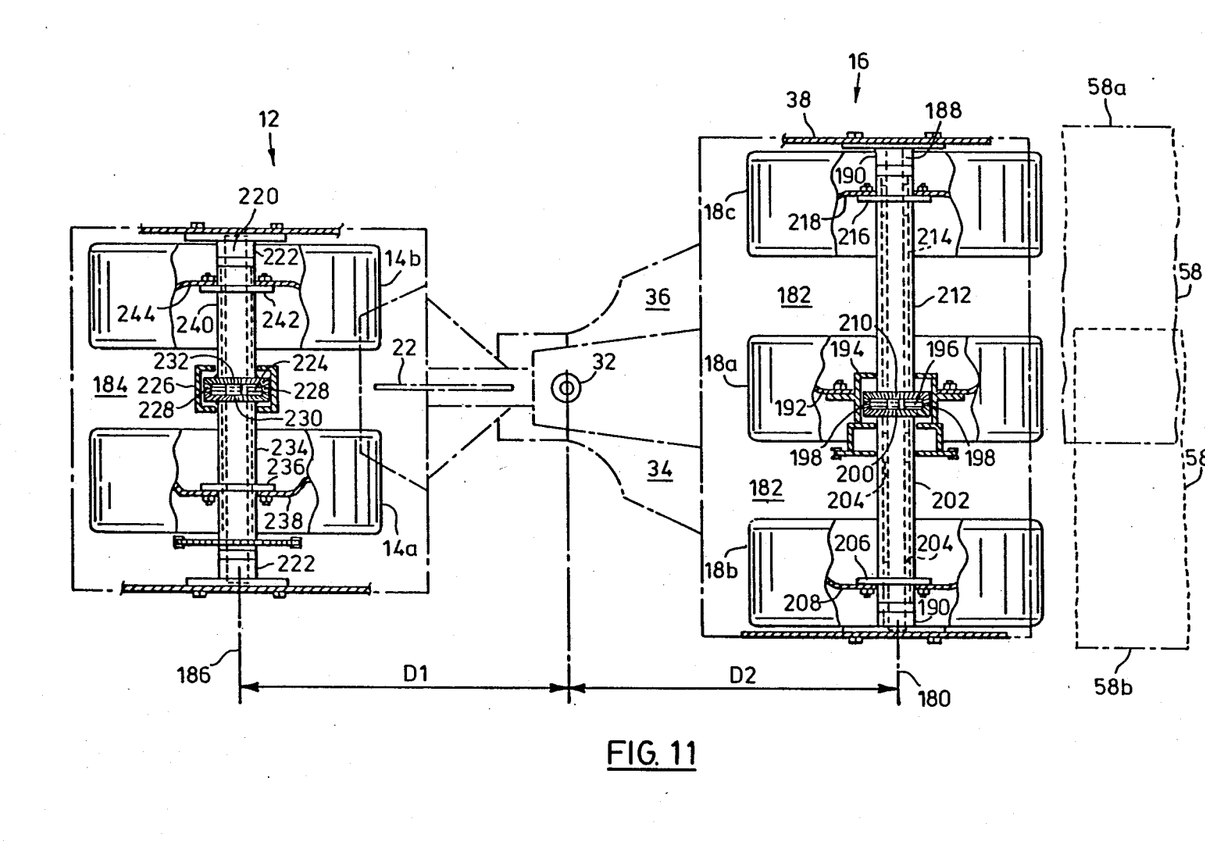
FIG. 11 is a plan view of a portion of the machine of FIGS. 1 and 2 showing the layout of the drive wheels.

As shown in FIG. 11 the front and rear wheels 18, 14 are arranged in a special configuration. Specifically, the front wheels 18 are spaced apart by lateral gaps 182 and the rear wheels 14 are located behind the gaps 182 and are wider than such gaps. Similarly the rear wheels 14 are spaced apart by a lateral gap 184 and the middle front wheel is located ahead of gap 184 and is wider than such gap. Thus the front and rear wheels together will evenly roll all of the width of the sod which has been laid, to help ensure that the laid sod is properly pressed against the ground.

In addition, as shown in FIG. 11, the distance D1 between the axis 186 of the rear wheels 14 and the axis of vertical tube 32 is made equal to the distance D2 between the axis of tube 32 and the axis 180 of the front wheels 18. This ensures that when the machine turns, the front and rear wheels 18, 14 maintain the track and eliminates the need for a front to rear differential. The arrangement also ensures that the front and rear wheels 18, 14 will continue to roll the entire width of the sod strip which has been laid, without missing any of the width.

The front wheels 18 are all supported on a cross shaft 188 journaled in bearings 190 mounted on the front section frame 38. The middle front wheel 18a is mounted on shaft 188 as follows. The hub 192 of front wheel 18a is bolted to a housing 194 which encircles shaft 188. The sprocket 81 is welded to housing 194 so that the middle wheel 18a turns directly with the sprocket 81. A pin 196 extends through housing 194, through shaft 188, and is fixed to the walls of housing 194 so that the housing 194 and shaft 188 turn as a unit.

The outer two front wheels 18b, 18c are driven as follows. Mounted on pin 196 are two planetary gears 198. The planetary gears 198 drive a gear 200 fixed to an outer tube 202. Outer tube 202 is rotatably mounted on the shaft 188 by bushings 204 for rotation within housing 194 and has a flange 206 welded thereto. The flange 206 is bolted to the hub 208 of wheel 18b. Similarly, the planetary gears 198 drive a second gear 210 fixed to a second outer tube 212. Tube 212 is rotatably mounted on the shaft 188 by bushings 214 for rotation within housing 194. Tube 212 has a flange 216 welded thereto which is bolted to hub 218 of the other outer front wheel 18c.

Thus, the middle front wheel 18a rotates at the speed of sprocket 81 and the outer front wheels 18b, 18c also operate at this speed when the machine is not turning. If the machine turns, the rotation of one of the other front wheels 18b, 18c slows and the rotation of the other wheel 18b, 18c speeds up to an equal extent. This provides a simple and effective single differential for the three front wheels and avoids the need for having two separate differentials (which would be more costly). The three way differential prevents scuffing of the newly laid sod when the machine 10 turns.

A similar differential is provided for the rear wheels 14 and is as follows. Driving sprocket 77 is fixed to a rear cross shaft 220 which rotates in bearings 222. A pin 224 extends through shaft 220 at its centre and is fixed to the walls of a housing 226. The pin 224 carries two planetary gears 228 which drive gears 230, 232. Gear 230 is welded to an outer tube 234 which drives rear wheel 14a through a flange 236 and hub 238. Gear 232 is welded to an outer tube 240 which drives rear wheel 14b through a flange 242 and hub 224. This provides a simple and inexpensive differential for the rear wheels.

In use the machine 10 is operated as follows. The operator will drive the machine to a sod roll 58 to be picked up and will extend the outrigger wheels 170. The gripper cylinder 124 is then operated to open the gripper arms 108 to the position shown in FIG. 8, and the machine is maneuvered until the gripper arms 108 straddle the sod roll 58 as shown in FIG. 8. The gripper cylinder 124 is then operated to close gripper arms 108 to grip the roll of sod.

If desired, the lateral position of the sod roll 58 can be adjusted before this procedure. Two alternative positions of sod roll 58 are shown in FIG. 11. As shown, the outboard edges 58a, 58b of the sod roll can be moved laterally outwardly of any other part of the machine, so that sod can be laid beside fences, walls and curbs. The lateral adjustment is achieved by loosening the hand wheel screw 120 on one gripper arm 108 while leaving the other hand wheel screw 120 firmly in place. The gripper cylinder 124 is then extended or retracted to move the one gripper arm laterally to the desired position.

The machine is then driven to the location where sod laying is required, and sod is laid as shown in FIG. 2. As there shown, the sod roll 58 is formed with its grass side 250 facing outwardly. This is contrary to the standard in the industry, in which sod is rolled with the grass side facing inwardly (which was thought to protect the sod better against heat and sun). The advantage of forming the sod roll as shown is that the area 252 of the sod strip, between the point 254 at which the sod leaves the roll 58 and extending around the bend 256 to the point 258 where the sod contacts the ground, can all be seen by the operator. This is the area in which tears and buckles are usually initiated. The operator's eye will normally be located as shown at 260 in FIG. 2, and it will be seen that there is a direct line of sight 262 from the operator's eye 260 to the area 252. Thus the operator can react quickly if a tear or buckle begins to occur, to prevent or minimize the occurrence and effect of these events. Even if the boom arms 96 are shortened to bring the sod roll 58 closer to the front of the machine (to improve balance and shorten the machine), the operator can still see all of area 252 by leaning forwardly or looking to the side of foot pedal 86.

Although the operator's seat 56 has been shown adjacent the front of the machine 10, the seat 56 is preferably brought even more forwardly and the platform 264 which supports the speed control pedal 86 (and a brake pedal not shown) is preferably arranged to project forwardly of the front wheels 18. The horizontal surface of platform 264 is made of open or expanded metal as indicated at 266 in FIG. 1, so the operator can see through it. This improves the operator's view of the important area 252 of the sod.

Although rolling sod with its grass side out is unusual, it is believed that such sod will keep as well as or better than sod rolled with the dirt side out. If the grass side dries out, the sod becomes dormant but not necessarily dead, but if the roots dry out, the sod dies.

Figure 4:
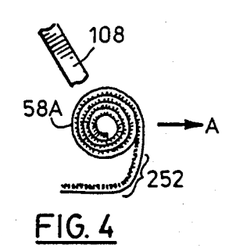
FIG. 4 is a schematic view showing an alternative method of laying sod.

If the sod were rolled with its grass side facing inwardly, then only two other alternatives would be available, both less desirable. In one alternative the sod 58A would be unrolled as shown in FIG. 4, with the machine moving forwardly in the direction of arrow A. In this case buckles and tears in the area 252 of the sod strip are not visible until after the sod roll has passed over them, by which time it is usually too late for the operator to control the speed of the control roller 138 to prevent such events.

Figure 5:
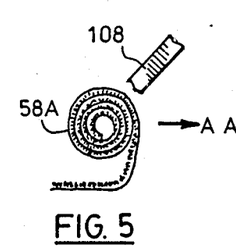
FIG. 5 is a schematic view showing another alternative method of laying sod.

The second alternative is to suspend the sod roll 58A (formed with its grass side facing inwardly) in the same manner as shown in FIG. 4 but to trail the sod roll behind the machine, as indicated in FIG. 5. The disadvantage of this is that it is more difficult to lay sod close up to a wall with the machine travelling forwardly. In addition the operator must then choose between watching closely the area in which the sod strip leaves the roll 58A and watching the direction in which the machine is going.

Figure 6:
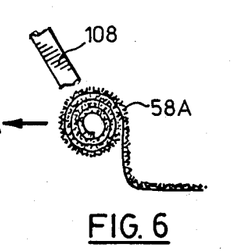
FIG. 6 is a schematic view showing another alternative method of laying sod.
Figure 7:
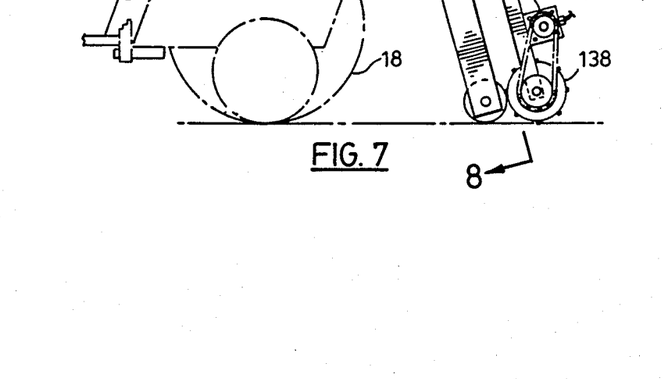
FIG. 7 is a side view of the front portion of the sod laying machine of FIGS. 1 and 2 in a position in which the machine is prepared to load a roll of sod.

It will be appreciated that in some cases, it may be desired to drive the machine 10 in reverse while laying sod. This is depicted in FIG. 6 and has all of the disadvantages of the methods shown in FIGS. 4 and 5, i.e. the area 252 is not visible to the operator; the operator must choose between watching where the machine is going and watching the sod, and the newly laid sod is not rolled by the machine. Therefore this method of using machine 10 will be used only where space limitations so require. However because of the articulated steering, the steering response of the machine is the same whether it is driven forwardly or in reverse, which facilitates laying of the sod while in reverse.

Because of the fragile and widely varying nature of sod, it is found that unrolling from a roll of sod formed with its grass side facing outwardly, and with the top of the roll travelling rearwardly so that the area where the sod leaves the roll can immediately be seen by the operator before anything passes over it, has major advantages over any methods of laying sod previously known to the applicants. However the machine 10, can if necessary lay sod rolls with the grass side facing inwardly, though this is less desirable.

The control roller 138 is normally driven at a speed which is synchronized with the ground speed of the machine but which is subject to control by the operator. As shown in the hydraulic circuit of FIG. 12, the variable displacement pump 72 is connected through a flow divider 272 to the rear drive motor 74 and to the front drive motor 78. The return line 274 from the rear drive motor 74 returns directly to the reservoir 68. However the return line 276 from the front drive motor 78 extends through a direction control three way valve 278, then back via line 280 to line 274. Two conduits 282, 284 extend from three way valve 278 to an auxiliary three way valve 286.

Figure 12:
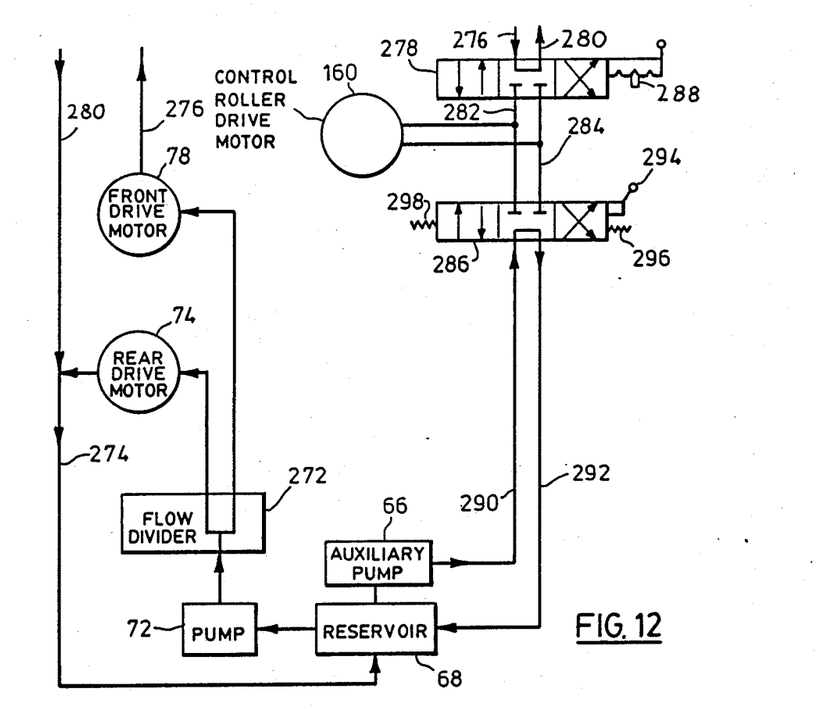
FIG. 12 is a schematic view of a portion of the hydraulic circuit for the sod laying machine of FIGS. 1 and 2.

The control roller motor 160 is connected to the conduits 282, 284.

When it is desired to operate the control roller motor 160 in synchronism with the front drive motor 78, then the direction valve 278 is operated either to the right or to the left to drive the control roller drive motor forwardly or in reverse in synchronism with the front drive motor 78. (Valve 278 is not necessary under some circumstances, if the flow through conduit 276 reverses when hydraulic motor 78 reverses.) When the machine is travelling forwardly to lay sod, the control roller drive motor 160 will be operated forwardly. When the machine is laying sod in reverse, the control roller drive motor 160 will be operated in reverse. A detent diagrammatically indicated at 288 locks the three way valve 278 in either forward or reverse condition.

With the mechanism shown, the surface of control roller 138 is arranged to travel at the same speed as the speed at which the machine 10 travels over the ground. If the machine 10 were mechanically rather than hydraulically driven, then a hydraulic pump would be connected to the output of a gearbox of the mechanical drive to obtain a ground drive and will drive the control roller motor 160 again to drive the surface of the control roller 138 at ground speed (and in this case valve 278 would be used since a pump is not normally reversed). Since the control roller 138 acts against the surface of the sod roll 58, the sod is unrolled from the roll 58 at the ground speed of the machine. One might expect that this would in theory be the correct speed to avoid tears and buckles in the sod being laid.

However driving the sod roll at precisely the ground speed of the machine will not always be appropriate, for several reasons. Firstly, the sod tends to stretch as it is being laid, due to its own weight as it hangs down from the roll 58, and this tends to form buckles. The buckles must be removed by braking the roll 58. Secondly, if the front and rear drive wheels lose traction and slip, the unrolling speed will be too high and must be slowed. Thirdly, if the control roller 138 itself slips on the roll of sod, more unrolling speed may be needed.

Therefore a separate hydraulic line 290 from the auxiliary pump 66 is directed to the auxiliary valve 286 and then back through another line 292 to the reservoir 68. When the auxiliary valve 286 is operated in one direction by a lever 294 against a return spring 296, additional pressurized fluid from the pump 66 is directed into the control roller motor 160 in one direction, either to increase its speed if the direction is the same as that in which fluid from the front drive motor 78 is being directed through the control roller motor 160, or to reduce its speed if the directions are opposite. When the auxiliary valve 286 is operated in the other direction by lever 294 against a return spring 298, the opposite result occurs. Thus the sod control roller 138 will operate continuously at a speed corresponding to the ground speed of the machine but with fine control intermittently exerted by the operator.

In use, as the operator drives the machine forwardly, he or she will watch the sod area 252. If the area 252 becomes too tight, i.e. if the sod begins to form a straight line between the roll 58 and the bottom of front wheels 18, the operator increases the speed of control roller 138 by a series of short pulses or "bumps" of lever 294. Each pulse imparts a momentary speed increase to control roller 138 and adds a short extra length of sod to area 252, to relieve the tension in the sod. Conversely, if a fold or buckle begins to appear in area 252, the operator slows down the speed of control roller 138 by a series of short pulses, to take up the slack. The distance D3 between the rear end of sod roll 58 and the front edge of front wheels 18 is made sufficient not only for adequate visibility of area 252 but also to allow the operator time to react before a tear occurs.

Because of the articulated steering, the operator can readily make fine adjustments in the direction in which the sod roll is facing, because small steering adjustments will pivot the entire front section 16 of the machine, including the boom arms 96.

Although a simple control roller has been shown to control the sod roll 58, if desired a roller with flats on it could be used, or even a conveyor having an appropriate drive. However a simple round roller is preferred because of its compactness and low cost.

Figures 13, 14:
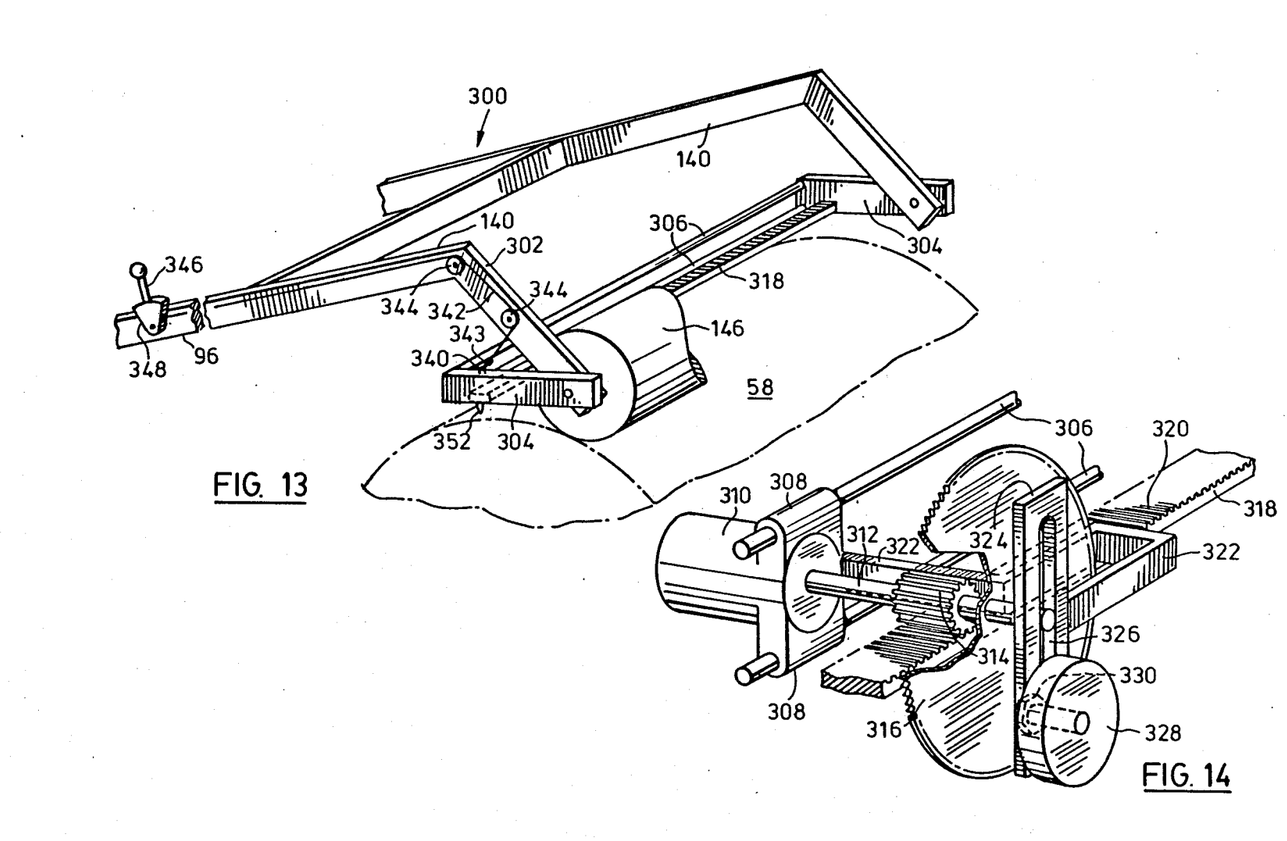
FIG. 13 is a perspective view of a cutoff mechanism for a sod laying machine of the invention.
FIG. 14 is a perspective view of a portion of the cutoff mechanism of FIG. 13.
Figure 15:
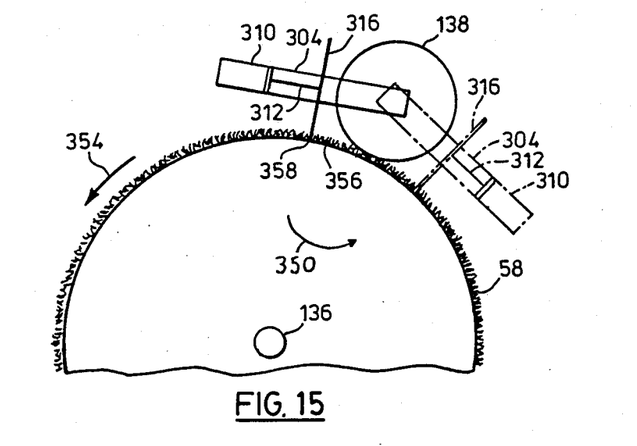
FIG. 15 is a diagrammatic side view showing the cutoff mechanism in two different positions.

Reference is next made to FIGS. 13 to 15 which show a cutoff for use with the sod laying machine previously described. When sod is being laid, it will be necessary periodically to sever the sod from the roll 58 to begin laying a fresh strip. This can be done using a cutoff indicated at 300 in FIGS. 13 to 15. In the version of the machine 10 shown in FIGS. 13 to 15, the control roller support arms 140 have a bend 302 therein, to provide clearance for a cutoff saw blade to be described. In addition the hydraulic motor 160 has been housed within the control roller cylinder 148 and is therefore not visible.

The cutoff 300 includes a pair of end plates 304 each pivotally mounted at the end of a control roller support arm 140. The pivotal axis of end plates 304 coincides with the axis of control roller 138. The end plates 304 carry at their outboard ends a pair of vertically spaced slide bars 306 which extend laterally between the end plates and are fixed thereto. Bushings 308 are slideably mounted on the slide bars 306 and are secured to the housing of a hydraulic motor 310. The shaft 312 of motor 310 projects toward the control roller and carries a pinion 314 and a saw blade 316. The pinion 314 engages a rack 318 which extends between and is fixed to end plates 304. The rack 318 has teeth 320 in its upper surface. (The motor, bushings and blade are not shown in FIG. 13 but are shown in FIGS. 14 and 15).

In use, when the hydraulic motor 310 is operated, the pinion 314 by engaging the rack 318 propels the saw blade 316 laterally across the outer surface of the sod roll 58 (which should be stationary at this time). The linear speed at the tips of the teeth of saw blade 316 is much higher than that at the surface of the pinion 314 because of the diameter difference (the pinion is very small while the saw blade may be e.g. 7.25 inches in diameter) so the arrangement cuts the sod effectively and quickly.

The depth of cut is set as follows. An arm 322 is fixed to the housing of the hydraulic motor 310 and extends around the side of saw blade 316 to the front thereof. The arm 322 terminates in a vertical bar 324 having a slot 326 therein. A depth gauge roller 328 has its shaft pivotably and adjustably mounted in slot 326 by a nut 330. By adjusting the height of roller 328 the depth of cut can be set so that the saw blade 316 will cut through one layer of sod on roll 58. If the cut were to extend slightly into the surface of the next layer, this would not matter so long as the roots and earth in the next layer are not cut.

The end plates 304 can be raised clear of the sod roll 58 as follows. One end plate 304 carries a hook 340 secured thereto. A cable 342 is clipped to the hook 340 by a clip 343 and extends over pulleys 344 located at each bend and pivot point in arms 140 and boom arms 96, back to a lever 346 located near the operator seat 56. The operator can thus pull the lever 346 and secure it by a detent 348 to hold the cutoff mechanism 300 away from the sod roll.

If the direction of unrolling of the sod roll is reversed, then the cutoff can also be reversed by unclipping the clip 343. The entire cutoff 300 is then swung beneath the control roller 138 as indicated by arrow 350 in FIG. 15, to the position shown in dotted lines in FIG. 15. (The sod roll will be removed during this procedure). The cable 342 is then clipped to a second hook 352 on the other side of end plate 304. A second depth gauge roller may be provided to control the depth of cut in this orientation, or alternatively roller 328 may be loosened and moved in slot 326 to the required new position. Thus the same cutoff can be used whether the sod roll is being unwound in a clockwise or counterclockwise direction.

The cutoff may be on the side of the sod roll where the sod is travelling downwardly, so that the sod in the roll will not fall backwardly. Alternatively the cutoff may be on the side of the roll 58 where the sod is travelling upwardly, as shown in FIG. 15 where arrow 354 indicates the direction of rotation of the sod roll. In this case the control roller 138 holds the flap of sod 356 which is located clockwise (as drawn) of the blade 316 and prevents such flap from falling backwardly.

In some cases it will be desired to dispense sod slabs from the roll. Such slabs are typically 24 inches by 24 inches in North America. In that case the circumference of the control roller may be made exactly 24 inches, so that one complete turn of the control roller will dispense a 24 inch long slab, and an appropriate mark may be placed on the control roller so that single turns can be observed.

When the machine 10 while laying sod is to be driven forwardly up to a wall or fence, the forward projection of the sod roll 58 and control roller 138 will prevent the machine from laying sod right up to the wall or fence. However typically the measurements of the machine 10 will be such that the length of the strip of sod extending from the cutoff point 358 (FIGS. 2, 15) to the ground contact point 258 is approximately equal to the distance from point 258 to the wall or fence when the machine is stopped just short of the wall or fence. Thus, when the sod is cut, the cut strip will fall to the ground and can then be laid with little waste. The length of the sod strip to be severed can be lengthened or decreased by respectively raising or lowering the boom 94 as needed.

Figure 16:
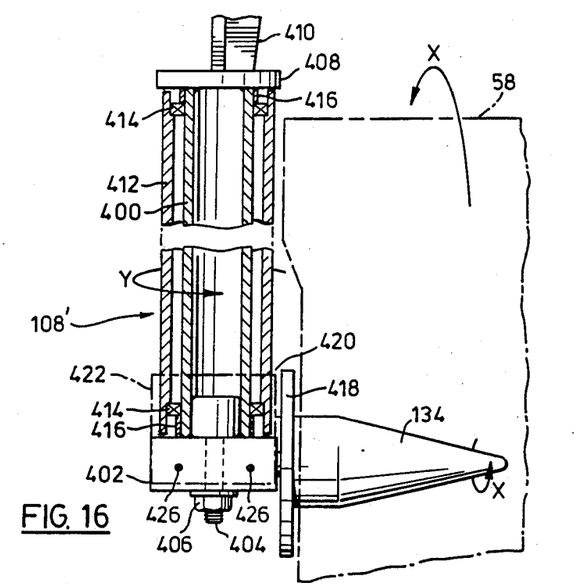
FIG. 16 is a sectional view showing a roller mounted on a support arm of the FIG. 1 machine.
Figure 17:
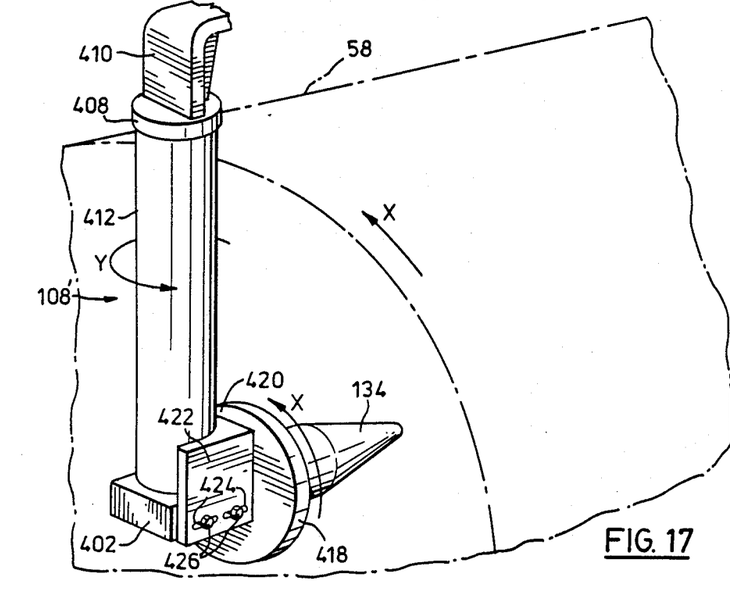
FIG. 17 is a perspective view of the arm of FIG. 16.

Reference is next made to FIGS. 16 and 17, which show a modification to the machine as described. It is found that in some cases, the edges of rolls of sod held between the gripper arms 108 tend to sag sideways and catch on the gripper arms as the rolls of sod are unrolled. This causes the rolls to jam so that they will not unroll further. It is then necessary to set down the roll of sod, side shift the arms and then pick up the roll of sod again.

To avoid this time consuming difficulty, the lower portions of the gripper arms 108 may be fabricated as indicated at 108' in FIGS. 16 and 17. As shown, each arm 108' includes a central tube 400 having a block 402 secured to the bottom end thereof by a bolt 404 and nut 406. An end plate 408 is welded to the upper end of the tube 400, and the arm 108' continues upwardly from the plate 408 as indicated at 410.

An outer tube 412 is rotatably mounted on the inner tube 400 by bearings 414. The bearings 414 are spaced from the block 402 and the end plate 408 by spacer sleeves 416. The cone-shaped support 134 is journaled in the block 402 as shown.

With the arrangement shown, when the roll of sod indicated in dotted lines at 58 rotates past the outer tube 412, the tube 412 can rotate, reducing the likelihood that sod from the edge of the roll will catch on the arms 108' and jam the roll. Although only a single outer tube 412 has been shown, if desired the tube 412 can be divided into segments to allow for the fact that the outer periphery of the sod roll 58 is travelling at a higher speed than the inner portion of the roll.

It is further found that where the outer tube 412 meets the flange 418 of the cone-shaped support 134, i.e. at point 420, a pinch effect occurs. In other words, at point 420 the flange 418, which is rotating in the direction of arrow X, meets the tube or roller 412, which is rotating in the direction of arrow Y. Sod engaging the two rotating surfaces at this point tends to be pinched between them, again jamming the roll 58 and preventing it from turning. To prevent this a guard plate 422 is provided. Plate 422 covers the front surface and inside front half of the surface of the lower portion of tube 412, where tube 412 meets flange 418. The plate 422 contains two slots 424 and is secured to block 402 by bolts 426 extending through such slots. This allows the position of the plate 422 to be adjusted so that it can be moved as close as possible to the flange 418, thereby eliminating the undesired pinch effect.

If the sod roll 58 is to be driven opposite to the direction of arrow X to any substantial extent, then a similar guard plate can be placed on the rear surface of block 402.

We claim:

1. A cutoff mechanism for severing a strip of sod from a roll of sod, said cutoff mechanism comprising:
    (a) support means adapted to extend laterally across a roll of sod,
    (b) a cutter mounted for movement back and forth across said support means,
    (c) means for driving said cutter laterally across said support means to cut through a layer of sod in said roll, and
    (d) adjustable depth gauge means for adjustably limiting the depth of penetration of said roll by said cutter.

2. A cutoff mechanism according to claim 1 wherein said cutter is a saw blade and said depth gauge is a roller.

3. A cutoff mechanism according to claim 2 and including control roller means for rotating said roll of sod, said control roller means being located in advance of said cutoff means.

4. A cutoff mechanism according to claim 3 wherein said cutoff means is coupled to said control roller means.

* * * * *